Figure 7:
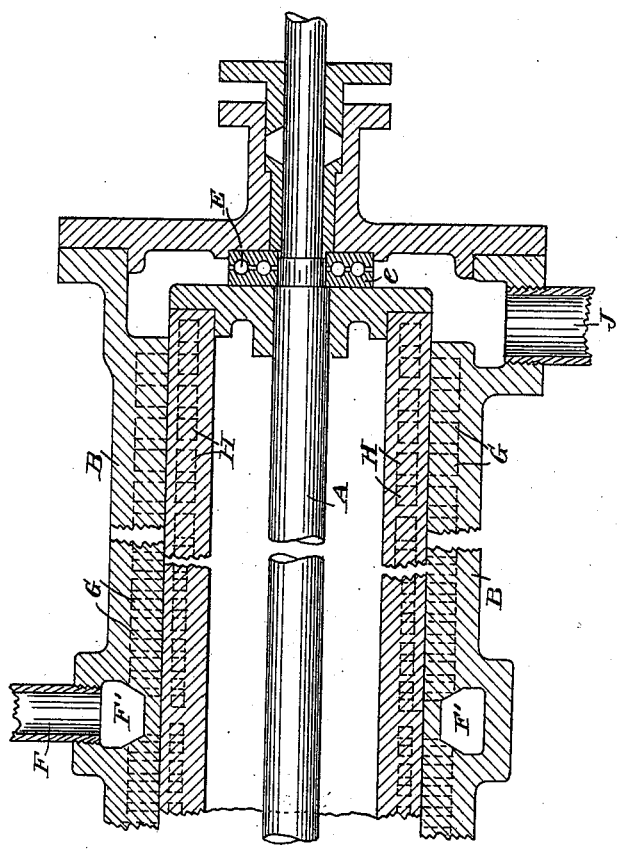

(No Model.) 3 Sheets—Sheet 1.
J. F. McELROY.
ROTARY ENGINE.
No. 510,483. Patented Dec. 12, 1893.
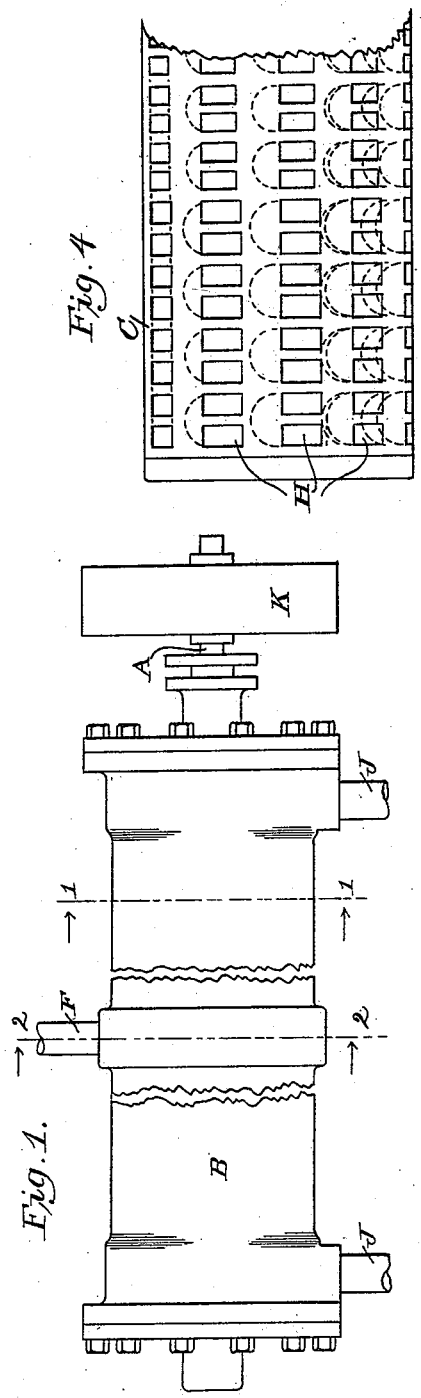
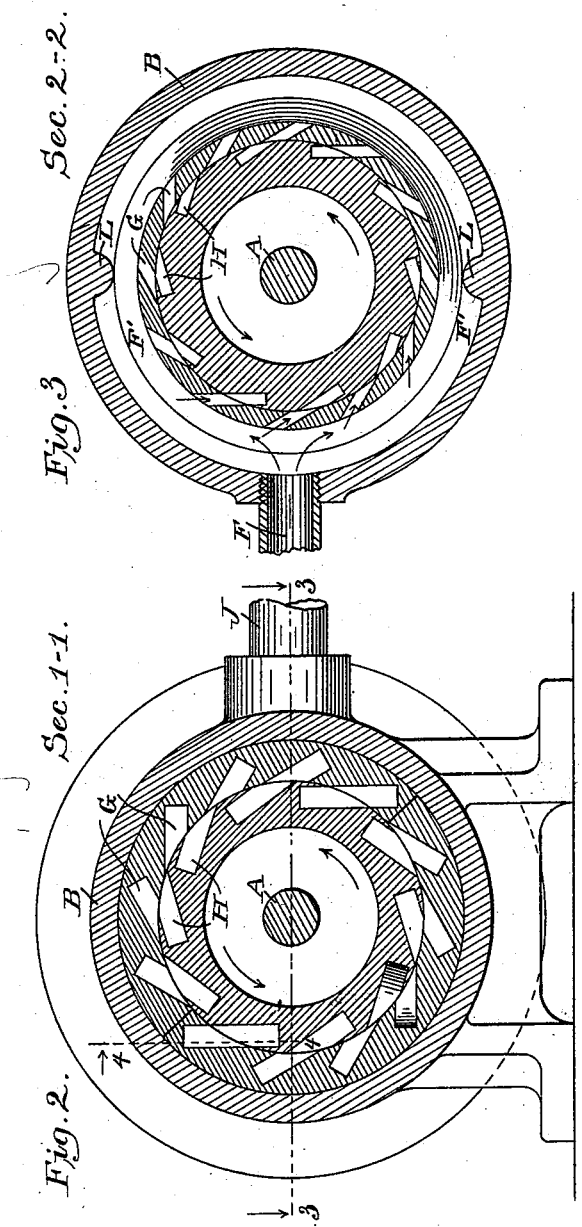
WITNESSES:
John W. Fisher
Grace T. Many
INVENTOR,
James F. McElroy.
BY
Frederick W. Cameron
ATTORNEY.

(No Model.)
J. F. McELROY.
ROTARY ENGINE.
No. 510,483. Patented Dec. 12, 1893.
3 Sheets—Sheet 2.
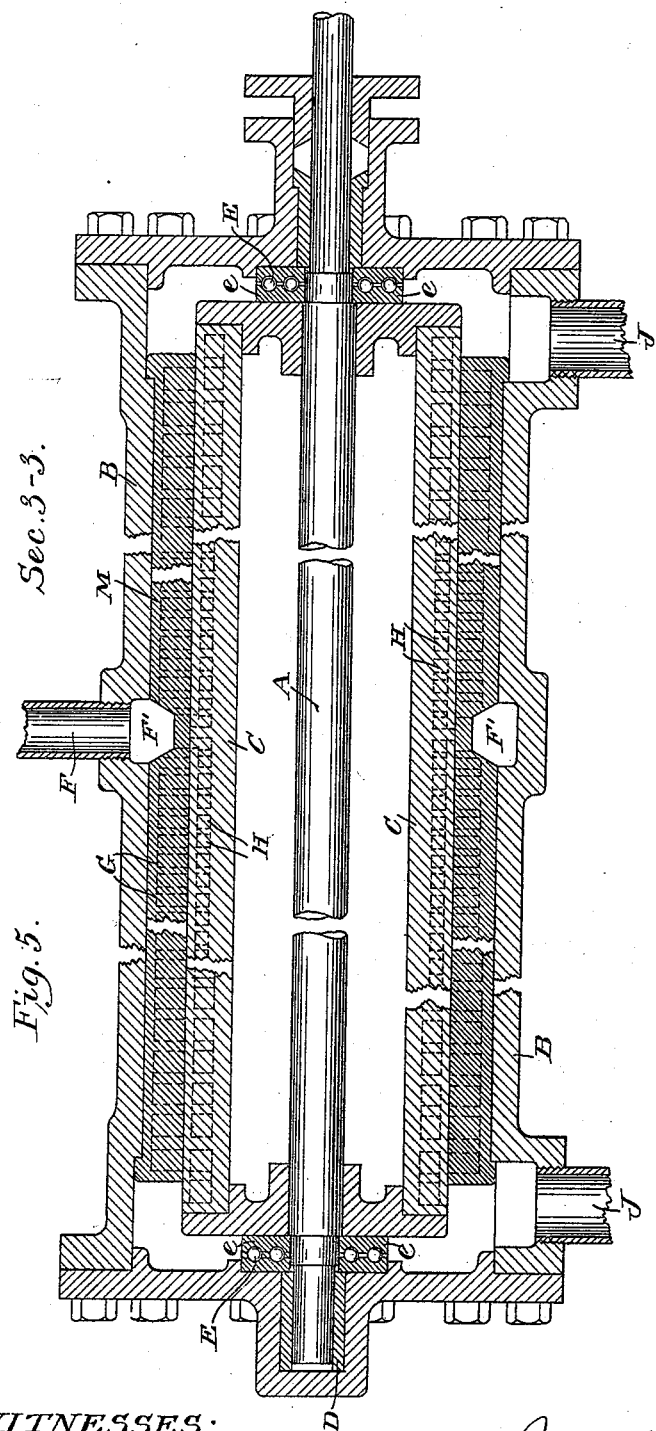
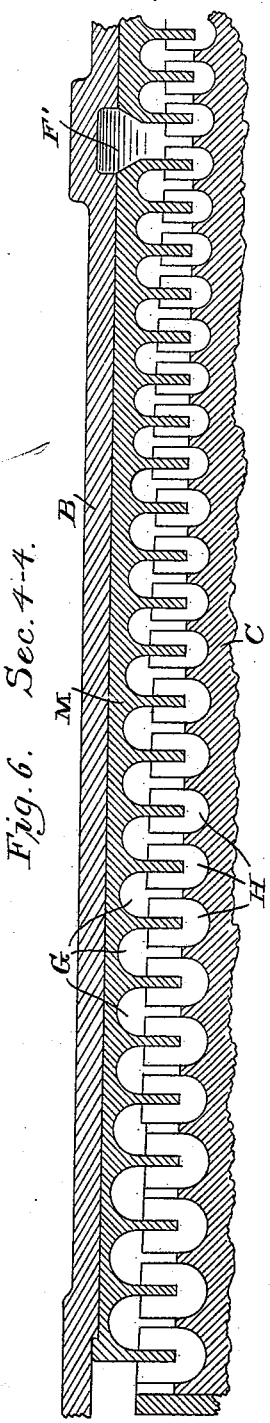
WITNESSES:
John W. Fisher
Grace T. Many
INVENTOR,
James F. McElroy
BY
Frederick W. Cameron
ATTORNEY.
THE NATIONAL LITHOGRAPHING COMPANY,
WASHINGTON, D. C.

(No Model.)  J. F. McELROY.  3 Sheets—Sheet 3.
ROTARY ENGINE.

No. 510,483.  Patented Dec. 12, 1893.

WITNESSES:  INVENTOR,
John W. Fisher.  James F. McElroy.
Grace T. Many.  BY
 Frederick W. Cameron
  ATTORNEY.

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

ROTARY ENGINE.

SPECIFICATION forming part of Letters Patent No. 510,483, dated December 12, 1893.

Application filed October 12, 1892. Serial No. 448,645. (No model.)

*To all whom it may concern:*

Be it known that I, JAMES F. MCELROY, a citizen of the United States, residing in the city and county of Albany, State of New York, have invented a new and useful Improvement in Rotary Engines, of which the following is a specification.

My invention relates to motors of the turbine type; and the object of my invention is to provide a rotary engine in which the exhaust takes place at each end, the turbine being made in two halves, duplicates of each other, and so constructed that a steam cushion may be formed which will tend to support the revolving cylinder of the turbine. I accomplish this object by means of the mechanism illustrated in the accompanying drawings, in which—

Figure 1 is a plan. Fig. 2 is a cross section along the lines 1—1 on Fig. 1. Fig. 3 is a cross section along the lines 2—2 on Fig. 1. Fig. 4 is a plan of the cylinder. Fig. 5 is a longitudinal section along the lines 3—3 on Fig. 2, and Fig. 6 is a section along the lines 4—4 on Fig. 2. Fig. 7 is a section of a modified form of my engine.

Similar letters refer to similar parts throughout the several views.

To the piston shaft A suitably mounted within the shell B, I key the cylinder C. One end of the piston shaft A is placed within a suitable bearing D and is provided with a double row of ball bearings E resting upon a suitable support in the end of the shell B and operated upon by a collar e secured to the piston shaft A.

Within the shell B and near the end of the piston shaft farthest from that already described, I arrange a ball bearing similar to that already described, the object being to permit of the revolution of the piston with as little friction as possible.

Midway between the ends of the shell B, I place the steam supply pipe F, which communicates with a recess F' extending around the shell and into the lining M and communicating with the openings G in the interior surface of the lining. The lining M is suitably secured within the shell B and is provided with a series of openings or pits G in the form of a return bend, as shown in Fig. 6. A number of similar series of pits or openings H formed in the shape of a U or with a return bend, are placed along the periphery of the cylinder C communicating with the openings G in the lining M, also shown in Fig. 6. The direction of the openings G and H is made such that the re-action in all openings tends to revolve the cylinder C in the same direction.

At each end of the shell B, I arrange the exhaust pipes J J. One end of the piston has keyed to it a belt carrying wheel K, as shown in Fig. 1. As thus arranged, the steam entering the shell at F' forms a ring about the cylinder C entering the openings G and H, as shown at F' in Fig. 6 and proceeds to exhaust from each end passing through the pits or openings first into the revolving cylinder and then in the stationary lining of the shell, passing from thence in a continuous channel toward each end of the shell and exhausting through the pipes J J.

The angle at which the openings are cut in the lining of the shell is shown in Figs. 2 and 3, which is at right angles to the radius.

The openings G and H, I construct in such a manner as to allow for the expansion of the steam, making the passage ways larger as they approach each end of the shell, in order that the full power and efficiency of the steam may be attained.

It will be seen from the construction of this apparatus, that the steam entering the engine at the center and exhausting at both ends, it has no tendency to drive the revolving cylinder against either end and in this respect the engine becomes entirely balanced. I preferably place the engine on end. It is evident then that the weight of the revolving cylinder will rest upon the two rows of ball bearings E at the lower end. When the engine is in motion and exhausting at both ports J J, I can create a back pressure upon the lower end by throttling the exhaust port. Should I then create a back pressure at the lower end exceeding the back pressure at the upper end, it is evident that there would be a tendency to lift the revolving cylinder. In this way, the engine may be made so that the weight of the revolving part is carried wholly upon the steam cushion, thus relieving the bearings of the revolving cylinder to a very appreciable extent from friction.

When it becomes desirable to place my engine upon its side, I preferably take the steam in at the lowest point of the circumference of the cylinder, so that the steam forms a cushion in the central ring and under the center of the cylinder.

By making restricted passages by placing an obstructing tongue L in the upper part of the steam ring, see Fig. 3, I create a greater pressure on the under side of the revolving cylinder C, which tends to raise the cylinder so that the weight thereof may be lifted in part or entirely from its bearings. In this case, it would be necessary that the exhaust ports J J at the opposite ends of the shell B be made of the same size, so as to give both ends the same back pressure of steam and insure a perfect balance of the revolving cylinder.

Fig. 7 shows a shell in which the U-shaped steam passages are cut or cored out of the interior surface of the shell instead of out of the lining placed within the shell as already described. The steam enters the engine from the center and passes into the openings G and H of the shell and cylinder toward each end of the engine in the same manner as hereinbefore described, the only modification being the elimination of the lining M.

The invention herein described is for a modification of the invention described by me in my application for Letters Patent filed July 7, 1892, Serial No. 439,245.

In this application, I introduce the steam about midway between the ends of the engine.

The operation of my invention is apparent.

What I claim as my invention, and desire to secure by Letters Patent, is—

1. In a rotary engine, the combination with a stationary shell provided with a steam inlet port about midway between the ends of the shell, and a steam exhaust port at each end thereof, a driving shaft mounted to rotate in said shell, a cylinder secured to said shaft within said shell, two or more series of disconnected U-shaped steam passage ways cored out of said cylinder, each series extending from one end of said cylinder to the other, with steam passage ways cored out of the interior wall of said shell or lining corresponding in width and direction to the passage ways in said cylinder, substantially as described and for the purpose set forth.

2. In a rotary engine, the combination with a stationary shell provided with a steam inlet port at about midway between the ends of the shell, a steam exhaust port at each end thereof, a driving shaft mounted to rotate in said shell, a cylinder secured on said shaft in said shell and provided with two or more series of U-shaped steam passage ways cored out from the periphery of said cylinder, the sides of each of said passage ways being at right angles to a radius of the cylinder passing through the bottom of the U-shaped passage ways, two or more lateral series of U-shaped passage ways cored out of the interior wall of said shell, said passage ways in the wall corresponding to and coinciding alternately with the passage ways in the cylinder in such a manner that the steam passes in a continuous channel formed along the surface of the cylinder, parallel to its axis, substantially as described and for the purpose set forth.

JAMES F. McELROY.

Witnesses:
EDWIN A. SMITH,
WILLIAM P. EDDY.